United States Patent
Reubens et al.

(10) Patent No.: US 9,555,830 B2
(45) Date of Patent: Jan. 31, 2017

(54) AXLE ASSEMBLY FOR A VEHICLE WITH A DOUBLE KINGPIN HINGE ARRANGEMENT

(71) Applicant: CNH Industrial America LLC, New Holland, PA (US)

(72) Inventors: Sam Reubens, Sint-Michiels (BE); Jean-Pierre Vandendriessche, Erpe-Mere (BE); Carlos J. A. Verheye, Roeselare (BE); Tom A. De Lathauwer, Lede (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/900,417

(22) PCT Filed: Jul. 1, 2014

(86) PCT No.: PCT/EP2014/063948
§ 371 (c)(1),
(2) Date: Dec. 21, 2015

(87) PCT Pub. No.: WO2015/000892
PCT Pub. Date: Jan. 8, 2015

(65) Prior Publication Data
US 2016/0144891 A1 May 26, 2016

(30) Foreign Application Priority Data
Jul. 2, 2013 (EP) .................................... 13174802

(51) Int. Cl.
*B62D 7/18* (2006.01)

(52) U.S. Cl.
CPC ...................................... *B62D 7/18* (2013.01)

(58) Field of Classification Search
CPC ......................................................... B62D 7/18
See application file for complete search history.

(56) References Cited

U.S. PATENT DOCUMENTS

| | | | | |
|---|---|---|---|---|
| 1,485,376 | A * | 3/1924 | Elbertz | B62D 7/18 280/124.126 |
| 2,739,658 | A * | 3/1956 | Kolbe | B60G 21/04 280/124.103 |
| 3,329,233 | A * | 7/1967 | Kolbe | B60G 21/04 180/424 |
| 3,980,317 | A * | 9/1976 | Kolbe | B60G 11/60 267/279 |

(Continued)

FOREIGN PATENT DOCUMENTS

| | | |
|---|---|---|
| WO | 2005068278 A1 | 7/2005 |
| WO | 2008128379 A1 | 10/2008 |

*Primary Examiner* — Darlene P Condra
(74) *Attorney, Agent, or Firm* — Patrick Sheldrake; Peter Zacharias

(57) ABSTRACT

An axle assembly for a vehicle includes an axle having opposite axle ends and a pair of axle hubs. The axle assembly has a pair of double kingpin hinge arrangements, each including a first pivot pin connected with a respective one of the axle ends, a second pivot pin operatively associated with a respective axle hub, and a knuckle interconnecting the first pivot pin and the second pivot pin. At least one steering cylinder is associated with each double kingpin hinge arrangement. Each steering cylinder is interconnected between the axle and the knuckle or the axle hub.

20 Claims, 15 Drawing Sheets

(56) References Cited

U.S. PATENT DOCUMENTS

| | | | | |
|---|---|---|---|---|
| 4,690,418 A | * | 9/1987 | Smith | B62D 7/18 |
| | | | | 280/93.512 |
| 5,269,546 A | * | 12/1993 | Pollock | B62D 13/04 |
| | | | | 280/81.6 |
| 6,776,425 B2 | | 8/2004 | Britton | |
| 8,286,985 B2 | | 10/2012 | Frocklage | |
| 2014/0361505 A1 | * | 12/2014 | Ormiston | B62D 7/18 |
| | | | | 280/93.512 |
| 2015/0151778 A1 | * | 6/2015 | Kageyama | B60G 3/20 |
| | | | | 701/41 |

* cited by examiner

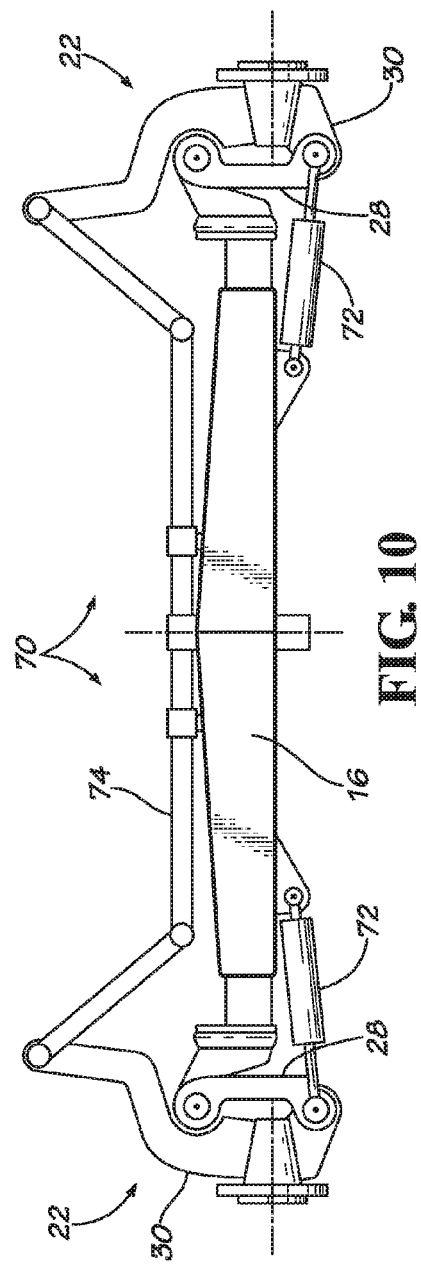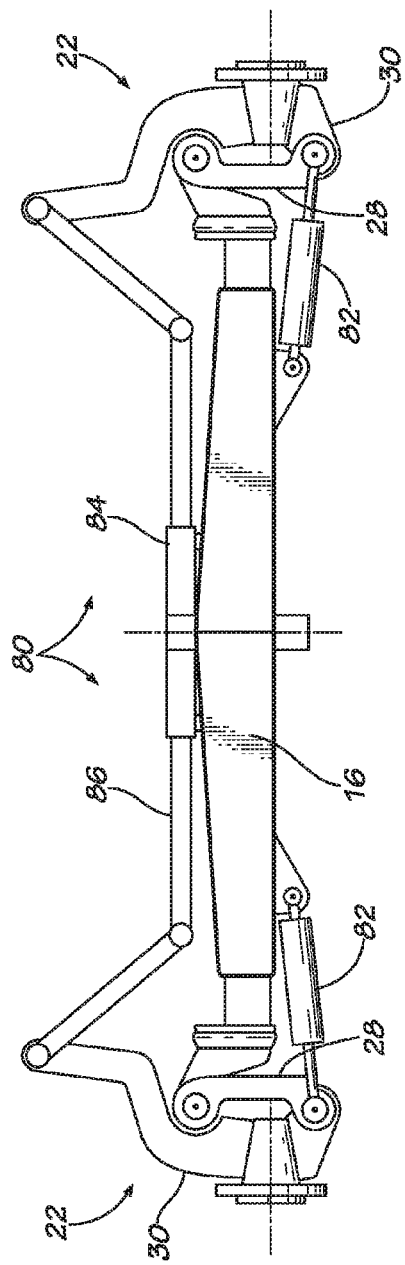

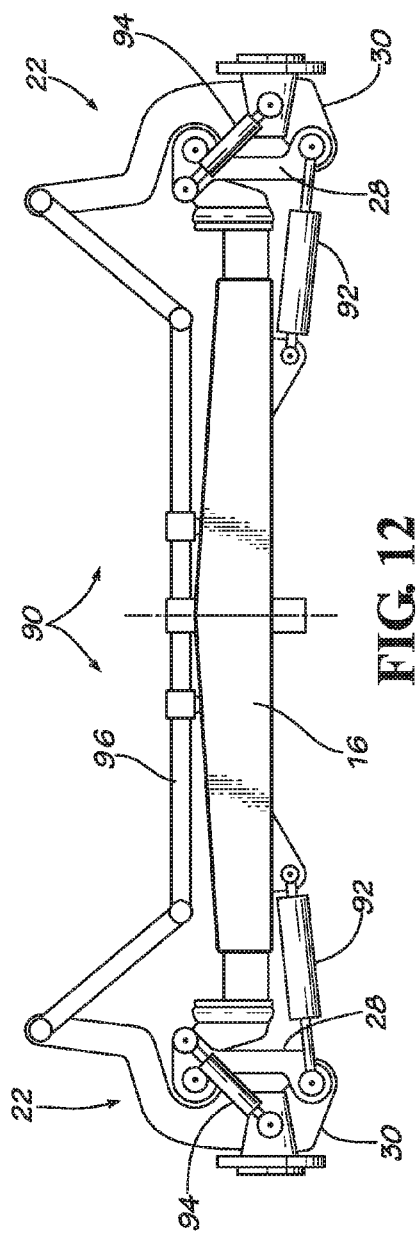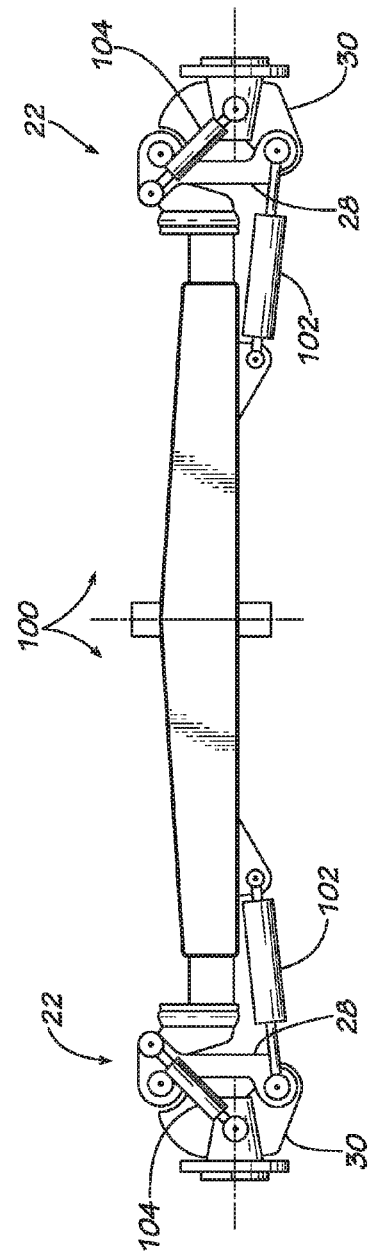

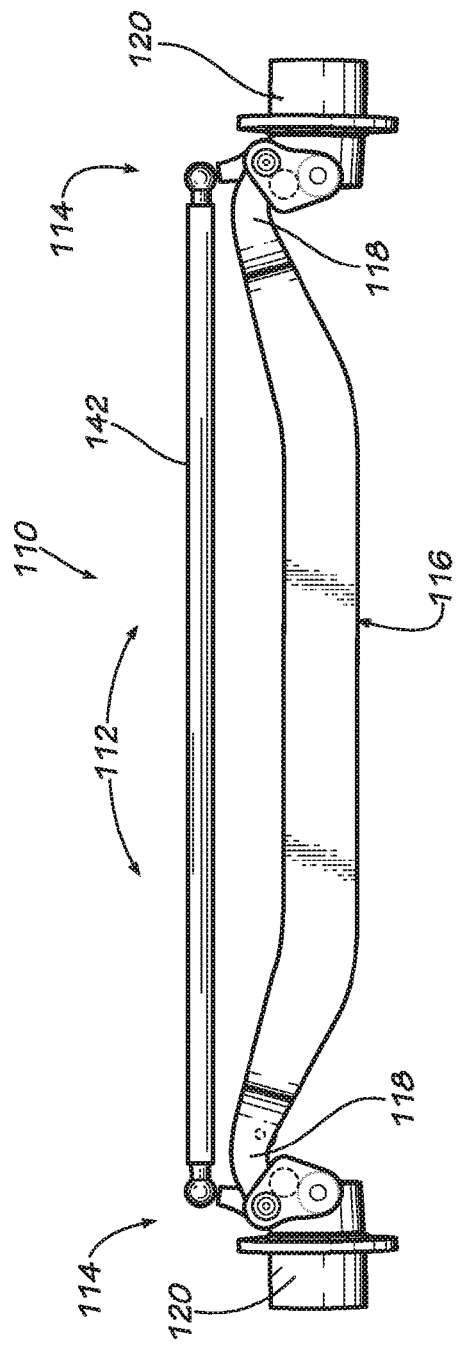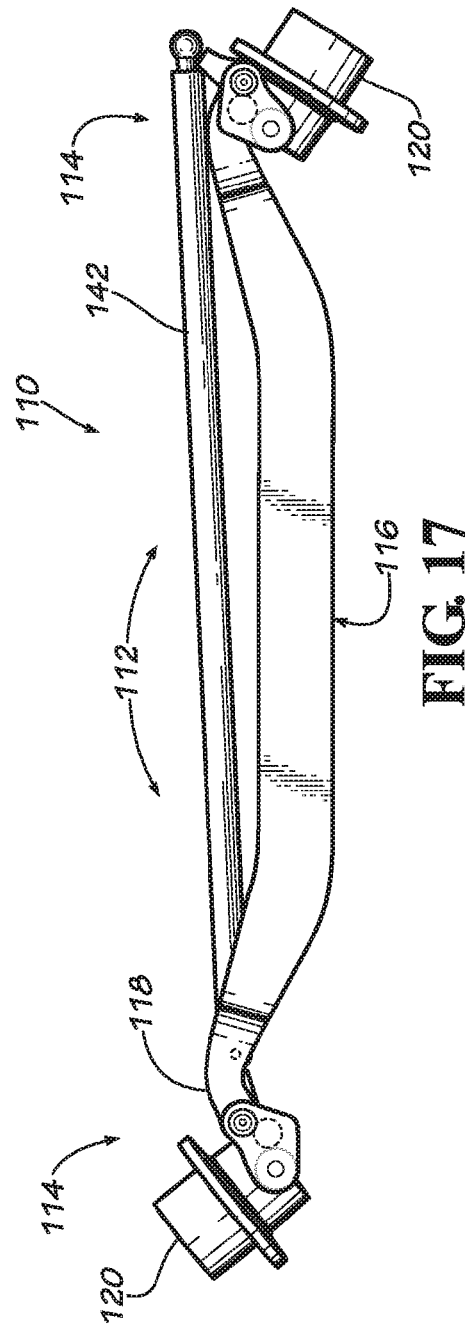
FIG. 16
FIG. 17

AXLE ASSEMBLY FOR A VEHICLE WITH A DOUBLE KINGPIN HINGE ARRANGEMENT

This application is the US National Stage filing of International Application Serial No. PCT/EP2014/063948 filed on Jul. 1, 2014 which claims priority to European Patent Convention Application 13.174.802.2 filed Jul. 2, 2013, each of which is incorporated herein by reference in its entirety.

BACKGROUND OF THE INVENTION

The present invention relates to axle assemblies for vehicles, and, more particularly, to steering arrangements for such axle assemblies.

Ground engaging work vehicles such as agricultural combines typically include a pair of axle assemblies, with each axle assembly including an axle, a pair of axle hubs at the respective longitudinal ends of the axle, and a pair or tires respectively mounted to the axle hubs. For steerable wheels, the axle hubs may be rotated relative to the axle about a kingpin such that the wheels are steered to a desired steering angle. Usually both wheels are steered with a power actuator such as a hydraulic cylinder, and the wheels are interconnected through a tie rod.

For agricultural vehicles, the tendency is for the vehicle to become larger and larger, so that the vehicle can pull and/or provide power to larger and heavier related equipment or implements. In the case of a combine, the size of the header or cutting platform mounted to the front of the combine tends to be larger over time, which increases power requirements. Grain storage capacity is also growing with higher threshing capacity, resulting in higher steering axle weights. Moreover, it is becoming more common to tow other implements behind the combine, such as biomass harvesters or related storage carts or wagons.

With larger combines, it may also be necessary or desirable to equip the combine with larger drive wheels and steering wheels. Such wheels provide a larger surface area contacting the ground, which in turn results in better traction, less soil compaction, less rolling resistance on wet soil, etc. However, in the case of the steering wheels, the use of larger wheels may also result in a smaller turning angle since the larger wheels can contact and potentially interfere with or damage the vehicle structure, such as frame members, sheet metal siding or housings, etc. A smaller turning angle causes a larger turning radius for the vehicle, which is not desirable. Additionally, road legislation in Europe is becoming more and more restrictive, requiring vehicle profiles to remain within certain width (3.5 m) and height (4 m) limits to drive without being accompanied by safety escort vehicles.

What is needed in the art is a steering arrangement for a large vehicle, such as a combine, which allows the use of large tires while at the same time retaining a tight turning radius for the vehicle.

SUMMARY OF THE INVENTION

The present invention in one form provides an axle assembly for a vehicle in which a double kingpin hinge arrangement interconnects the axle with an axle hub. The double kingpin hinge arrangement includes two pivot pins respectively associated with the axle and axle hub, and a knuckle interconnecting the two pivot pins.

The invention in one form is directed to an axle assembly for a vehicle, including an axle having opposite axial ends and a pair of axle hubs. The axle assembly is characterized by a pair of double kingpin hinge arrangements, each including a first pivot pin connected with a respective one of the axle ends, a second pivot pin operatively associated with a respective axle hub, and a knuckle interconnecting the first pivot pin and the second pivot pin. At least one steering cylinder is associated with each double kingpin hinge arrangement. Each steering cylinder is interconnected between the axle and the knuckle or the axle hub.

The present invention also provides an axle assembly for a vehicle in which a double hinge interconnects the axle with an axle hub. The double hinge has an inboard knuckle which pivots about a first pivot axis, and an outboard knuckle which pivot about a second pivot axis, with rotational constraints placed upon each pivot axis such that a larger turning angle is achieved without interfering with adjacent vehicle body structure.

The invention in another form is directed to an axle assembly for a vehicle, including an axle having opposite axial ends, a pair of axle hubs, and a pair of double hinges. Each double hinge includes an inboard knuckle, an outboard knuckle, a first pivot pin interconnecting one end of the inboard knuckle with a respective one of the axle ends, and a second pivot pin interconnecting an opposite end of the inboard knuckle with the outboard knuckle. The outboard knuckle is connected with a respective axle hub. Each double hinge further includes a mechanical stop which limits a rotation of the inboard knuckle about the first pivot pin in a direction toward the respective axle end, whereby the outboard knuckle can rotate about the second pivot pin when the inboard knuckle engages the mechanical stop.

An advantage of the present invention is that the effective wheel stance of at least one of the wheels on an axle is increased during turning, thereby allowing a larger turning angle without the tire contacting the chassis or other structure of the vehicle.

Another advantage is that larger tires can be used while still maintaining a smaller turning radius.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 10 illustrates an axle assembly with an embodiment of a steering arrangement of the present invention;

FIG. 11 illustrates an axle assembly with another embodiment of a steering arrangement of the present invention;

FIG. 12 illustrates an axle assembly with yet another embodiment of a steering arrangement of the present invention;

FIG. 13 illustrates an axle assembly with still another embodiment of a steering arrangement of the present invention;

FIG. 16 is a top view of an axle assembly with yet another embodiment of a steering arrangement of the present invention including a double kingpin hinge arrangement, with the wheels at a zero degree (0°) steering angle;

FIG. 17 is a top view of the axle assembly of FIG. 16, with the wheels turned to the right;

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
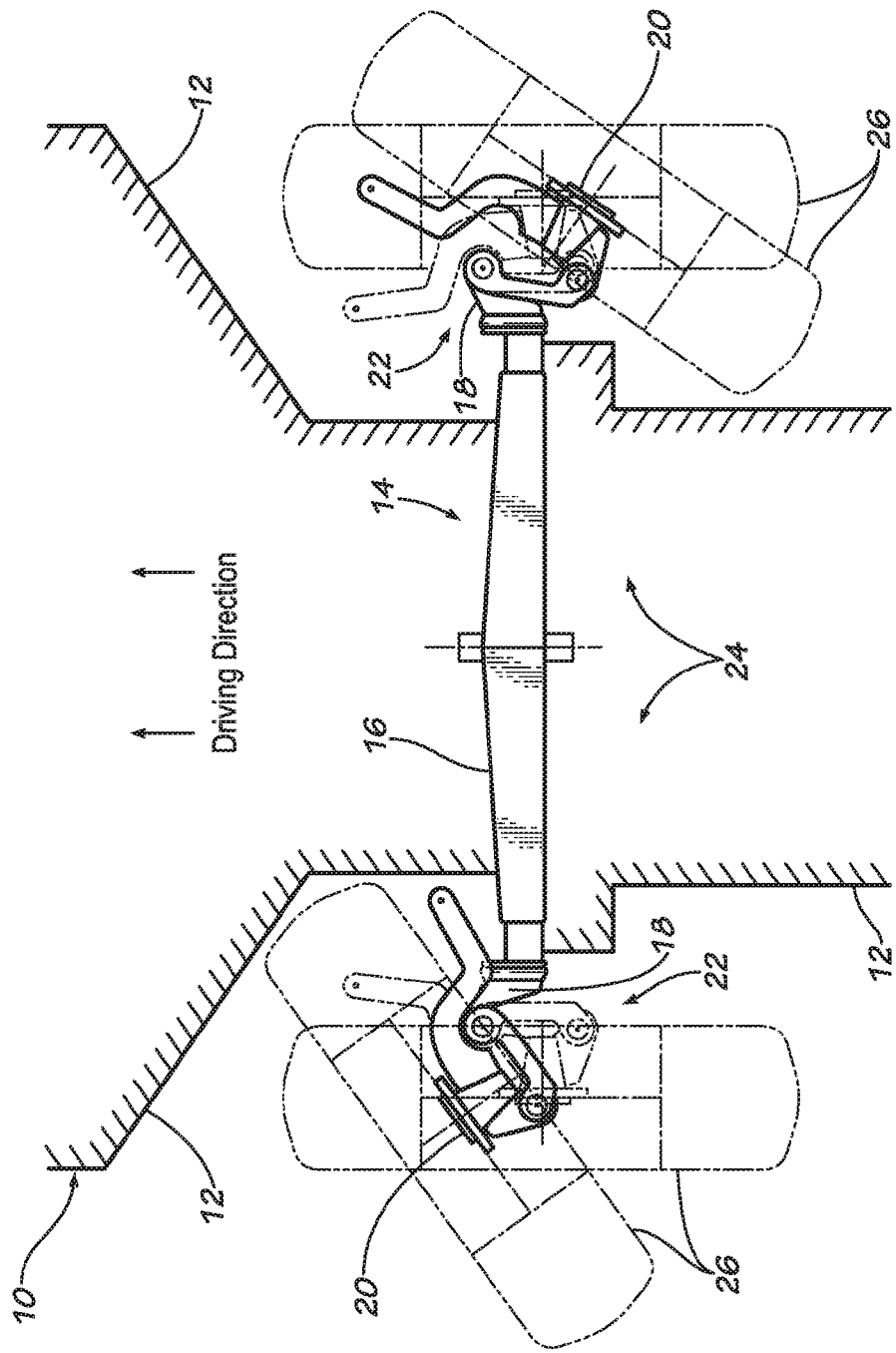
FIG. 1 is a top schematic view of a vehicle in the form of an agricultural combine, including an embodiment of an axle assembly of the present invention.

Referring now to the drawings, and more particularly to FIG. 1, there is shown a vehicle 10 including a body 12 carrying an axle assembly 14. The body 12 can include a chassis with frame members carrying sheet metal or other housing components (not shown). In the illustrated embodiment, the vehicle 10 is in the form of an agricultural combine; however, it is to be understood that the vehicle 10 can be a different type of vehicle.

The axle assembly 14 is a steerable axle assembly, and includes an axle 16 with opposite axial ends 18, a pair of axle hubs 20, and a pair of double hinges 22, with each double hinge 22 interconnecting between an axle hub 20 and a respective axle end 18. Each double hinge 22 forms part of a steering arrangement 24 of the present invention for selectively steering wheels 26. Each axle end 18, pair of axle hubs 20 and pair of double hinges 22 are assumed to be configured substantially identical, and therefore the detailed description which follows hereinafter is understood to apply to both the left and the right ends of axle assembly 14.

Figure 2:
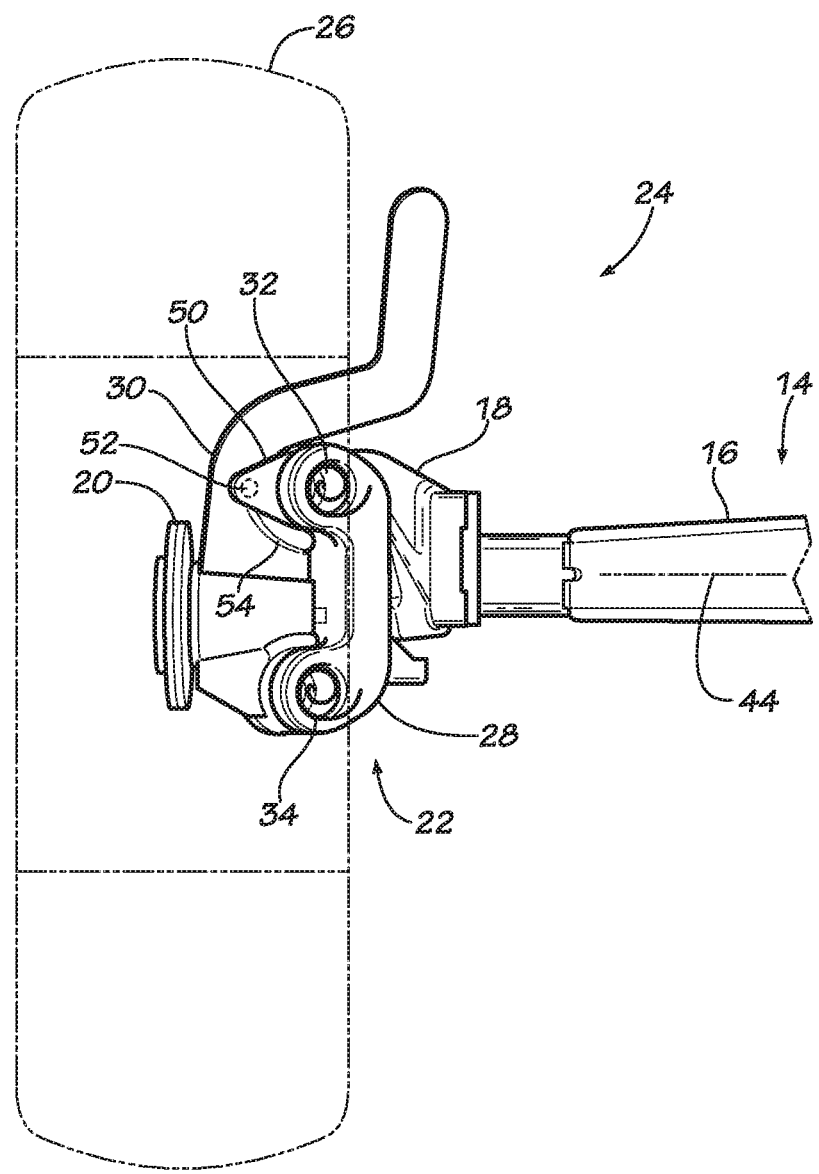
FIG. 2 is a top view of the steering arrangement associated with the left wheel shown in FIG. 1, with the wheel at a zero degree (0°) steering angle.
Figure 3:
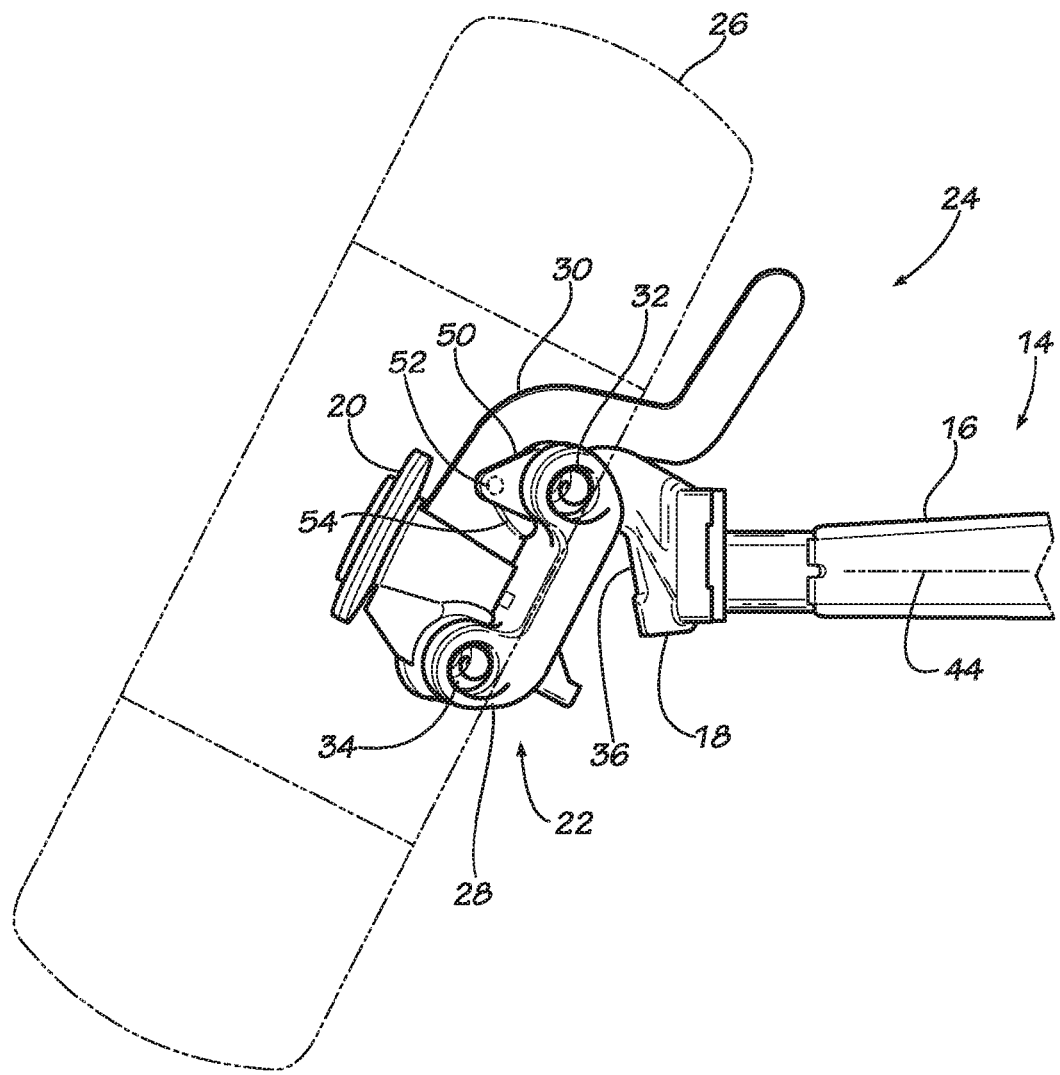
FIG. 3 is a top view of the steering arrangement shown in FIG. 2, with the wheel pivoted to the front.
Figure 4:
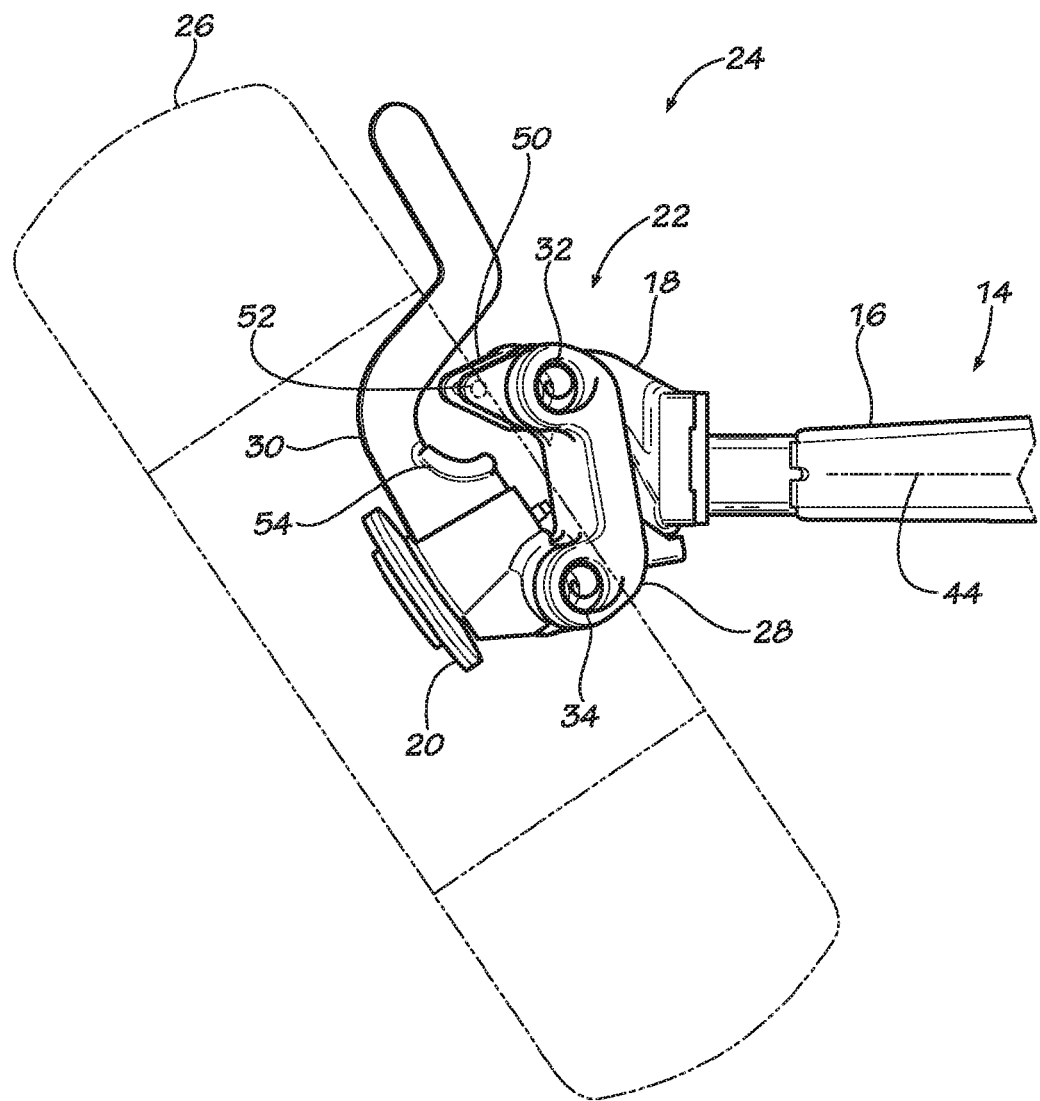
FIG. 4 is a top view of the steering arrangement shown in FIGS. 2 and 3, with the wheel pivoted to the rear.

Referring now to FIGS. 2-4, the steering arrangement 24 associated with the left wheel shown in FIG. 1 will be described in greater detail. FIG. 2 shows the left wheel at a zero degree) (0°) steering angle, FIG. 3 shows the left wheel pivoted to the front, and FIG. 4 shows the left wheel pivoted to the rear. The double hinge 22 includes an inboard knuckle 28 and an outboard knuckle 30. A first pivot pin 32 interconnects one end of the inboard knuckle 28 with the axle end 18. A second pivot pin 34 is positioned rearward of the first pivot pin 32 and interconnects an opposite end of the inboard knuckle 28 with the outboard knuckle 30. First pivot pin 32 and second pivot pin 34 each have a generally vertical orientation, and may be configured with any desired King Pin Inclination (KPI) and caster angle. The outboard knuckle 30 is connected with the axle hub 20. In contrast with conventional axle assemblies having a single kingpin, the first and second pivot pins 32 and 34 define double kingpins which are part of the double hinge 22, which can also be referred to as a double kingpin hinge arrangement.

The double hinge 22 includes a mechanical stop 36 which limits a rotation of the inboard knuckle 28 about the first pivot pin 32 in a direction toward the axle end 18. When the inboard knuckle 28 engages the mechanical stop 36, the outboard knuckle 30 can then rotate about the second pivot pin 34. In the embodiment illustrated in FIGS. 2-4, the mechanical stop 36 is in the form of a stop surface which is associated with the axle end 18. When the inboard side of inboard knuckle 28 engages the stop surface 36, the outboard knuckle 30 can then rotate about the second pivot pin 34 (see FIG. 4).

It will be appreciated that the particular configuration and placement location of the stop surface 36 can vary from one application to another. In the embodiment shown in FIGS. 2-4, the stop surface 36 is a simple planar surface positioned at a desired angle at the axle end 18. However, the stop surface 36 could have a shape which is non-planar, could be positioned at a different angular orientation, could abut with a projection or recess formed as part of the inboard knuckle 28, etc. The primary idea is that a mechanical stop is provided to limit the degree of rotation of the inboard knuckle 28 about the first pivot pin 32 when the wheel is pivoted in a rearward direction.

Figure 5A:
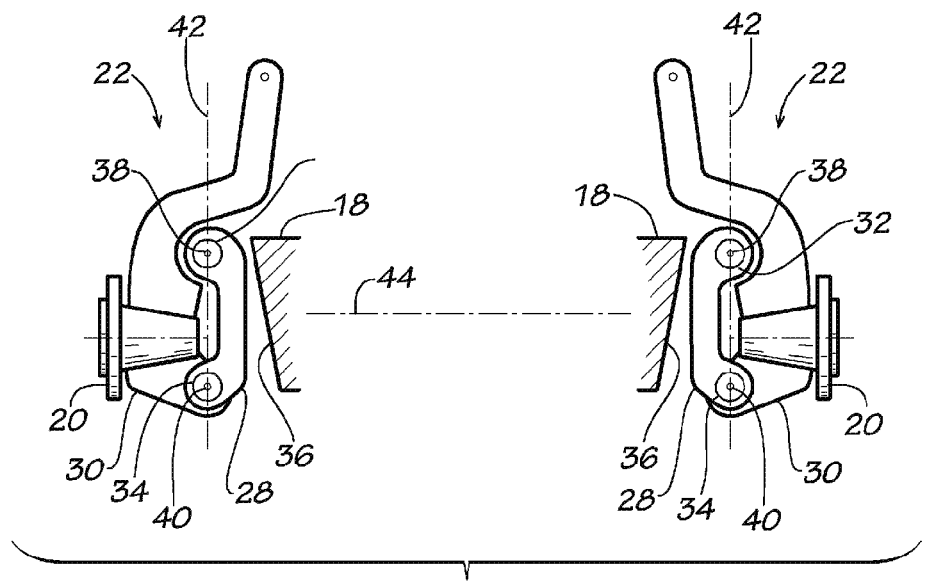
FIGS. 5A and 5B are top schematic views of the left and right steering arrangements during a small steering angle turn, with the wheels turned to the right in FIG. 5B.
Figure 5B:
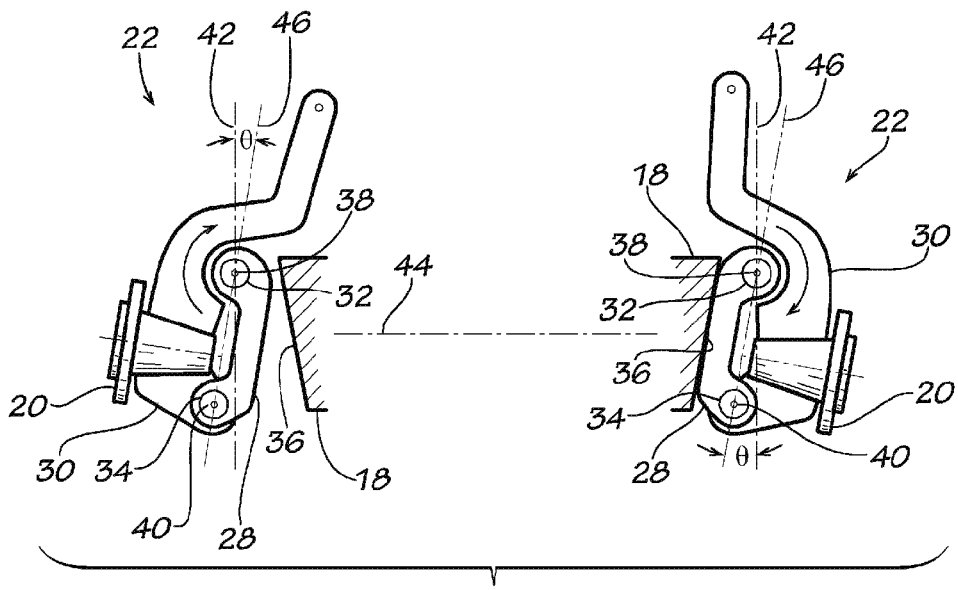

According to another aspect of the present invention, the double hinge 22 pivots about the front or first pivot pin 32 for small steering angles, and pivots about the rear or second pivot pin 34 for large steering angles. Referring to FIGS. 5A and 5B, there are shown top schematic views of a steering arrangement 24 for both the left and right double hinges 22 during a small steering angle turn, with the wheels turned to the right. Both the left and right axle hubs 20 pivot about the front or first pivot pin 32. In FIG. 5B, the right hand inboard knuckle 28 is shown contacting the stop surface 36, which is the maximum steering angle at which the right-hand double hinge 22 pivots about the front or first pivot pin 32.

More particularly, the first pivot pin 32 defines a first pivot axis 38 and the second the pin 34 defines a second pivot axis 40. The stop surface 36 is located relative to a steering angle (referred to as the stop angle (θ)) between a transverse axis 42 which is perpendicular to a longitudinal axis 44 of the axle 16, and a line 46 extending between the first pivot axis 38 and the second pivot axis 40. When the inboard side of the inboard knuckle 28 contacts the stop surface 36, then further pivotal movement of double hinge 22 about the first pivot axis 38 is prevented and outboard knuckle 30 subsequently pivots about second pivot axis 40.

Figure 6A:
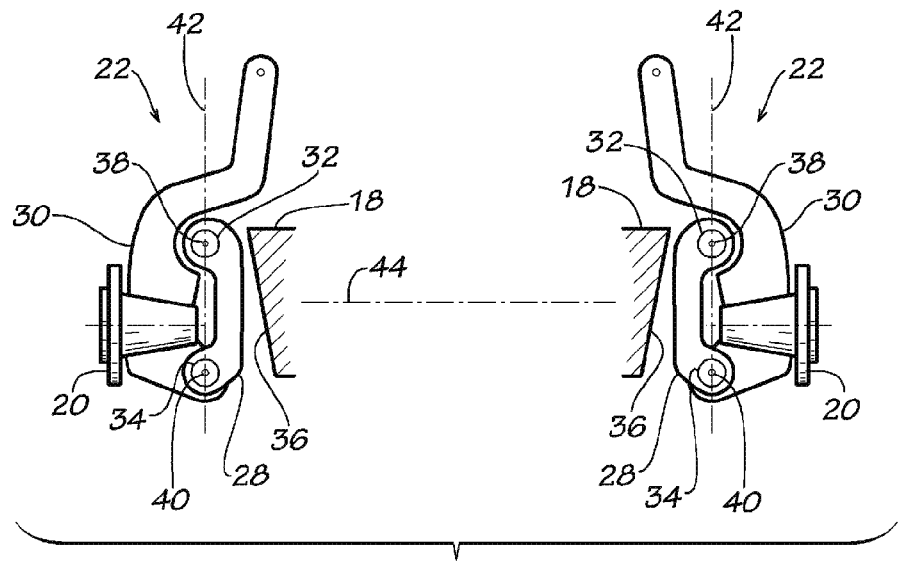
FIGS. 6A and 6B are top schematic views of the left and right steering arrangements during a large steering angle turn, with the wheels turned to the right in FIG. 6B.
Figure 6B:
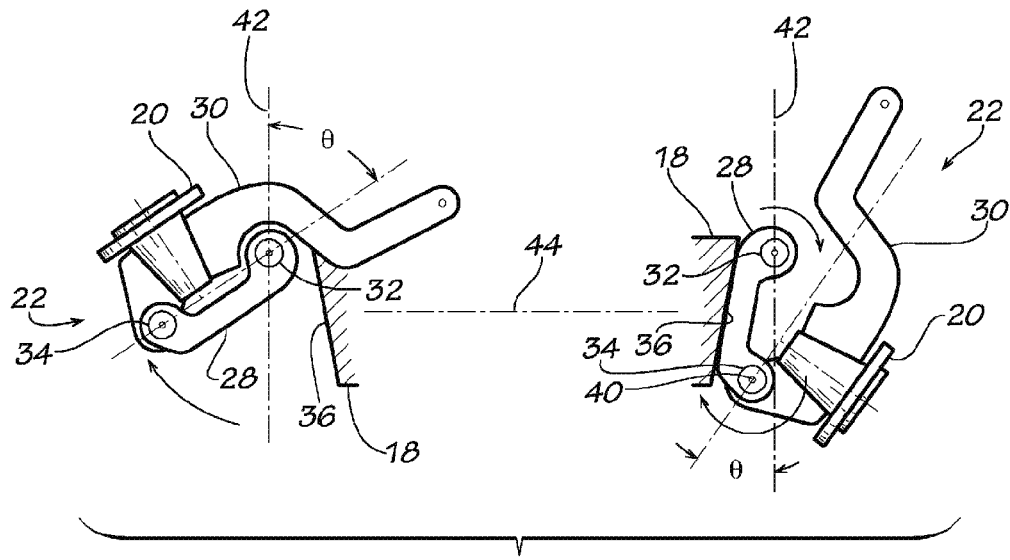

Referring to FIGS. 6A and 6B, there are shown top schematic views of a steering arrangement 24 for both the left and right double hinges 22 during a large steering angle turn, with the wheels turned to the right in FIG. 6B. When turning to the right, the left wheel pivots about the front or first pivot pin 32, as shown on the left hand side of FIG. 6B. In contrast, for larger steering angles, after the inboard side of inboard knuckle 28 contacts the stop surface 36, then further rotation of axle hub 20 occurs through the rotation of outboard knuckle 30 about second pivot pin 34, as shown on the right hand side of FIG. 6B. In the illustrated embodiment, the stop angle (θ) at which the mechanical stop 36 is engaged is between approximately 0° to 20°, preferably between approximately 5° to 15°, and more preferably approximately 10°.

The double hinges 22 in the steering arrangement 24 preferably use locks so that the multiple degrees of freedom of movement are controlled. Two locks may be used per double hinge 22 to fully define the steering arrangement 24 and create a stable steering system.

Figure 7B:
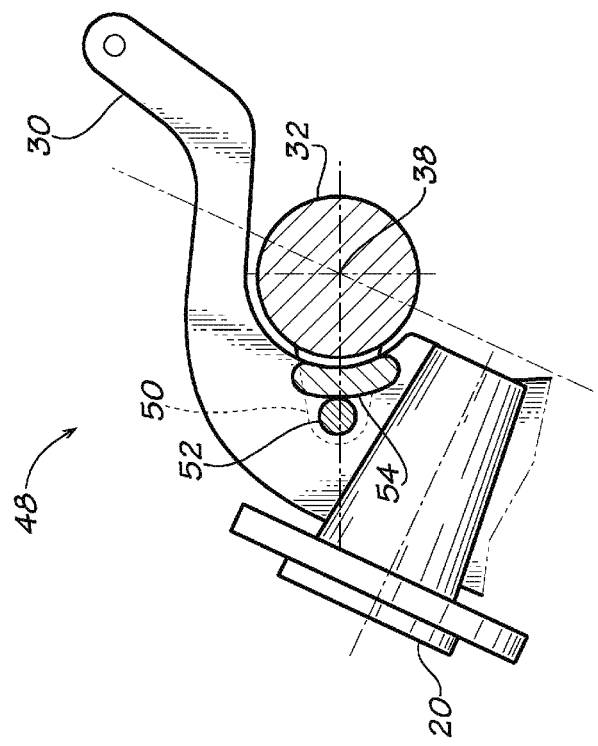
FIGS. 7A and 7B are schematic views showing a cam and pin lock for locking the inboard knuckle and outboard knuckle together.
Figure 7A:
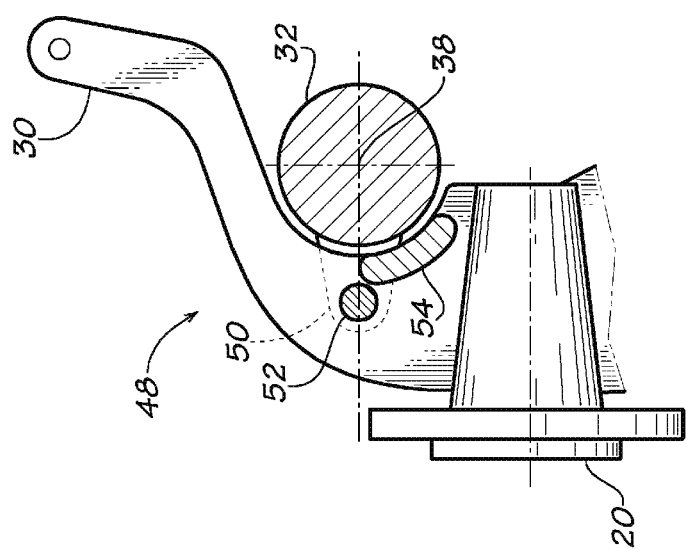

FIGS. 7A and 7B illustrate a cam and pin lock 48 which is used to lock the inboard knuckle 28 relative to the outboard knuckle 30. When the axle hub 20 and wheel 26 pivot about the front pivot axis 38, the inboard knuckle 28 and the outboard knuckle 30 remain fixed relative to each other by locking the second pivot pin 34. As shown in FIGS. 7A and 7B, and referring also to FIGS. 2-4, the axle end 18 includes an outboard projection 50 with a downwardly extending pin 52. The outboard knuckle 30 has an arcuate shaped upstanding wall 54 with a radius of curvature which is parallel to the outside diameter of first pivot pin 32. When the wheel 26 is turned in a forward direction, as shown in FIGS. 3 and 7B, the static pin 52 is positioned behind the upstanding wall 54, which slides along the pin 52 to retain the outboard knuckle 30 in a folded and locked position relative to the inboard knuckle 28. When the wheel 26 is at a 0° steering angle as shown in FIG. 2, the pin 52 is positioned adjacent to the front of the upstanding wall 54. As the wheel 26 is turned toward the rear of the axle as shown in FIG. 4, the pin 52 is no longer positioned behind the upstanding wall 54, and the outboard knuckle 30 can pivot about the second pivot pin 34 after the inboard knuckle 28 contacts the stop surface 36.

Figure 8A:
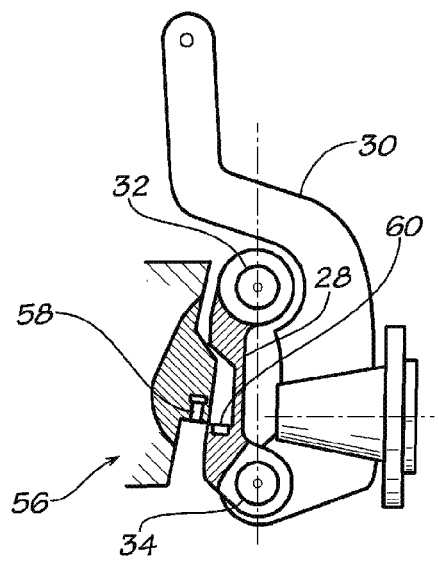
FIGS. 8A and 8B are schematic views showing a pin lock for locking the inboard knuckle and the axle end together.
Figure 8B:
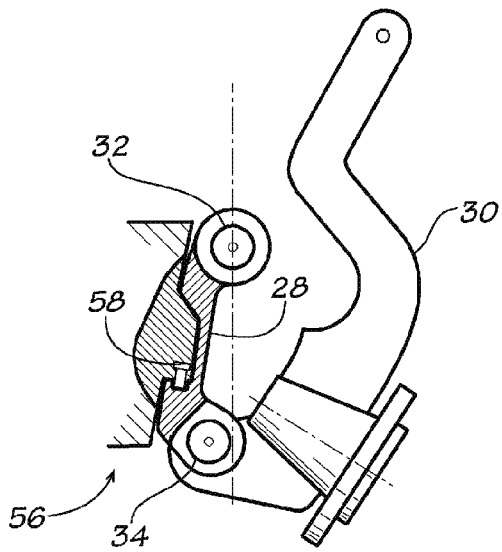

FIGS. 8A and 8B illustrate a pin lock 56 which locks the inboard knuckle 28 relative to a respective axle end 18. When pivoting to the rear, the inboard knuckle 28 may be locked to the axle end 18, which in turn locks the first pivot pin 32. The axle end 18 may include a pin 58 which is selectively extended and retracted using a suitable actuator, such as a mechanical, hydraulic or electrical actuator. When the inboard knuckle 28 is against the stop surface 36, the pin 58 is extended into a hole 60 in the inboard knuckle 28.

Figure 9:
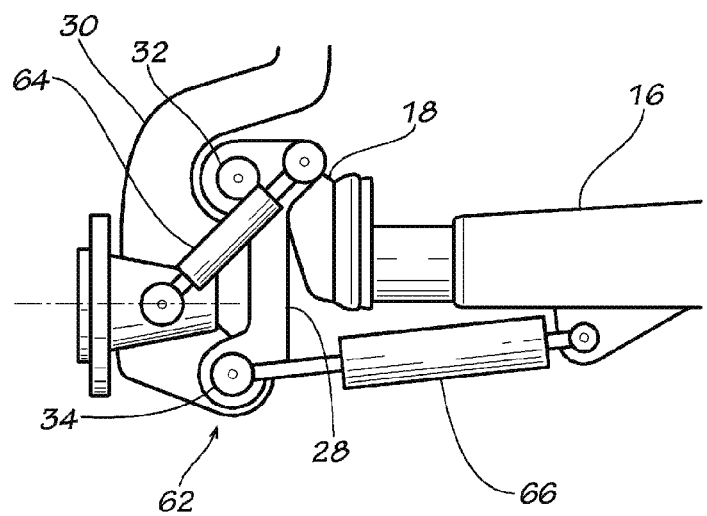
FIG. 9 is a schematic view showing a fluid cylinder lock for locking the inboard knuckle, the outboard knuckle and the axle end relative to each other.

FIG. 9 illustrates a fluid cylinder lock arrangement 62 which locks the inboard knuckle 28 relative to the axle 16 and/or the outboard knuckle 30. A front steering cylinder 64 interconnects between the inboard knuckle 28 and the outboard knuckle 30, and a rear steering cylinder 66 interconnects between the axle 16 and the inboard knuckle 28 (via rear pivot pin 34). To lock rotation about the front or first pivot pin 32, the large or rear steering cylinders 66 may be locked with the hydraulic ram at a desired position to prevent rotation about the first pivot pin 32. To lock rotation about the second pivot pin 34, the small or front steering cylinder 64 may be locked with the hydraulic ram at a desired position to prevent rotation about the second pivot pin 34. The rear steering cylinder 66 also defines a mechanical stop when the ram is locked at a selected length to cause rotation of outboard knuckle 30 about second pivot pin 34.

With the fluid cylinder lock arrangement 62 shown in FIG. 9, it may be possible to vary the position of the mechanical stop defined by the rear steering cylinder 66. The stop or lock position of the rear steering cylinder 66 also corresponds to the stop angle at which the inboard knuckle 28 locks and further rotation occurs about the rear or second pivot pin 34. By varying the stop or lock position of the rear steering cylinder 66 (i.e., the location at which the rear steering cylinder 66 will not be further retracted), the position of the mechanical stop and corresponding stop angle can vary.

Moreover, using a fluid cylinder to define the mechanical stop, it is possible to have a moving mechanical stop which nonetheless defines the position at which rotation begins to occur about the rear or second pivot pin 34. As the inboard knuckle 28 rotates about the first pivot pin 32, the speed at which the ram in the rear steering cylinder 66 is retracted and extended can vary using a controller. The rear steering cylinder 66 can be positioned at a stop angle (θ) corresponding to the mechanical stop, after which rotation occurs about the rear or second pivot pin 34. When rotation begins to occur about the second pivot pin 34, the rear steering cylinder 66 can be retracted at a slow or slower rate which allows the location of the mechanical stop to move during operation, while still allowing rotation to occur about the second pivot pin 34. In this instance the rotation about second pivot pin 34 is non-exclusive, in that rotation can also occur about the front or first pivot pin 32 as the rear steering cylinder slowly retracts. Thus, in contrast with other embodiments where rotation exclusively or only occurs when the mechanical stop is engaged, it is also possible to have non-exclusive rotation about the second pivot pin 34 when the mechanical stop is engaged.

FIGS. 10-22 illustrate embodiments of different steering arrangements which may be utilized with the present invention. FIG. 10 is a schematic view of a steering arrangement 70 configured with two steering cylinders 72 and a tie rod 74. The steering cylinders 72 are rear steering cylinders, preferably two way cylinders, which are interconnected between the axle 16 and a respective inboard knuckle 28. Assuming rear wheel steering with a turn to the left, the left hand steering cylinder 72 extends while the right hand steering cylinder 72 clamps and locks the inboard knuckle 28 against the stop surface 36 of the axle end 18. A locking device, such as the cam and pin lock 48 shown in FIG. 7, fixates the outboard knuckle 30 relative to the inboard knuckle 28 as the left hand wheel 26 rotates in a forward direction. The steering movement of the left hand wheel 26 is transmitted through the sliding tie rod 74 to the right hand wheel 26. To turn the wheels 26 back to a straight position (i.e., 0° steering angle), the left hand steering cylinder 72 retracts while the right hand steering cylinder 72 continues to clamp. The total steering force for both wheels 26 is thus generated using one rear steering cylinder 72.

FIG. 11 is a schematic view of a steering arrangement 80 configured with three steering cylinders 82 and 84, and a tie rod 86. The steering cylinders 82 are rear steering cylinders which are interconnected between the axle 16 and a respective inboard knuckle 28. The steering cylinder 84 is a front steering cylinder which is located at the approximate longitudinal center of the axle 16. The steering cylinder 84 is a two-way cylinder with a sliding piston rod extending out each end of the cylinder which forms part of the tie rod 86.

FIG. 12 is a schematic view of a steering arrangement 90 configured with four steering cylinders 92 and 94, and a tie rod 96. The pair of steering cylinders 92 are rear steering cylinders which are interconnected between the axle 16 and a respective inboard knuckle 28. The pair of steering cylinders 94 are front steering cylinders which are interconnected between an inboard knuckle 28 and a respective outboard knuckle 30. With steering arrangement 90, steering is achieved by extending two diagonally placed cylinders (one large or rear steering cylinder 92 and one small or front steering cylinder 94, at opposite ends of the axle 16), while the other two cylinders operate as clamping devices. The tie rod 96 insures the mechanical linkage between both wheel ends.

FIG. 13 is a schematic view of a steering arrangement 100 which is configured with four steering cylinders 102 and 104. Steering arrangement 100 is similar to steering arrangement 90 shown in FIG. 12, but does not include a tie rod. The pair of steering cylinders 102 are rear steering cylinders which are interconnected between the axle 16 and a respective inboard knuckle 28. The pair of steering cylinders 104 are front steering cylinders which are interconnected between an inboard knuckle 28 and a respective outboard knuckle 30. The tie rod is replaced by an electronic control system which measures the steering angles and controls the motion of the four cylinders 102 and 104 to achieve the optimal steering angle for each wheel 26.

Figure 14:
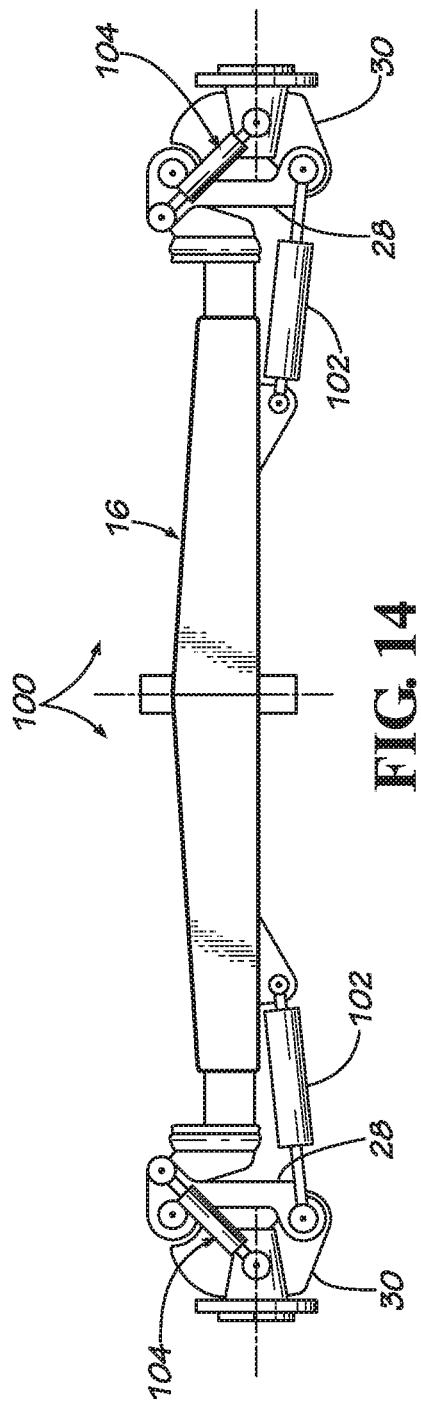
FIG. 14 illustrates an axle assembly with yet another embodiment of a steering arrangement of the present invention, with the axle assembly in a retracted state.
Figure 15:
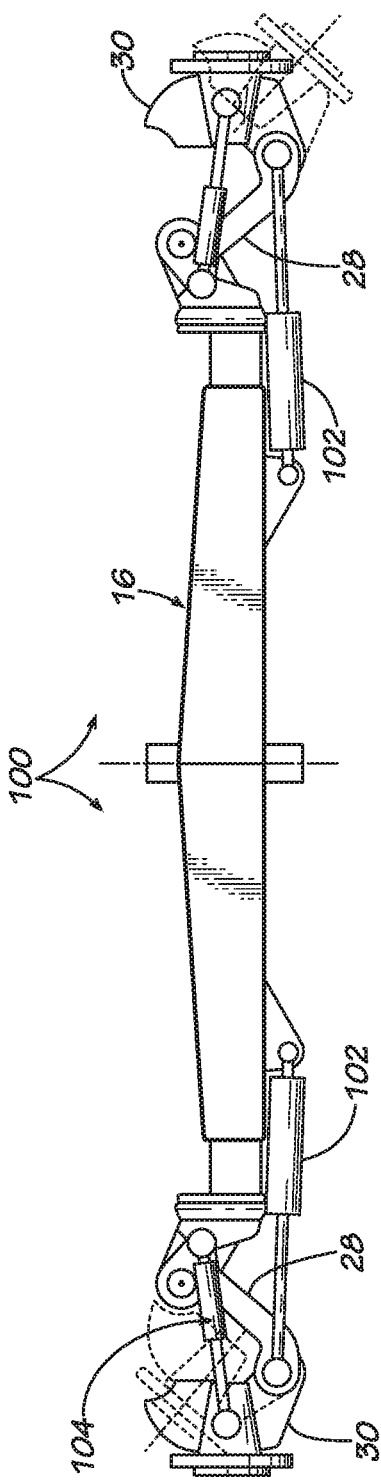
FIG. 15 illustrates the axle assembly and steering arrangement of FIG. 14, with the axle assembly in an extended state.

FIGS. 14 and 15 illustrate the steering arrangement 100 shown in FIG. 13, when used for the additional functionality of an extendable and retractable axle assembly providing an adjustable wheel stance. When driving in a transport mode, such as on a public road, the axle is used in a retracted position with the wheels within a legal track width (FIG. 14). However, when driving in the field the inboard knuckles 28 can be pushed out to enlarge the track width to improve the vehicle's side stability (FIG. 15). The large or rear steering cylinders 102 are then only used for pushing the wheels out and locking the inboard knuckle 28 into the extended position. The wheels 26 now rotate only about the outer most pivot axes (i.e., about second pivot pins 34) so that the axle 16 functions as a traditional steering bridge. Steering forces are only delivered by the two smaller or front steering cylinders 104.

Figure 18:
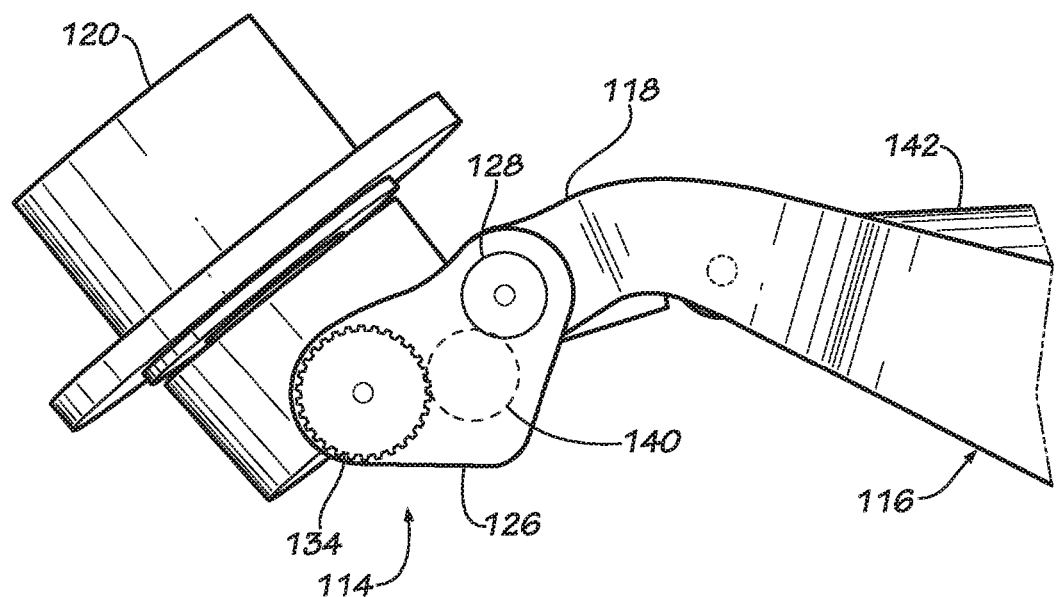
FIG. 18 is a top view of the left end of the axle assembly shown in FIGS. 16 and 17, showing the double kingpin hinge arrangement in more detail.
Figure 19:
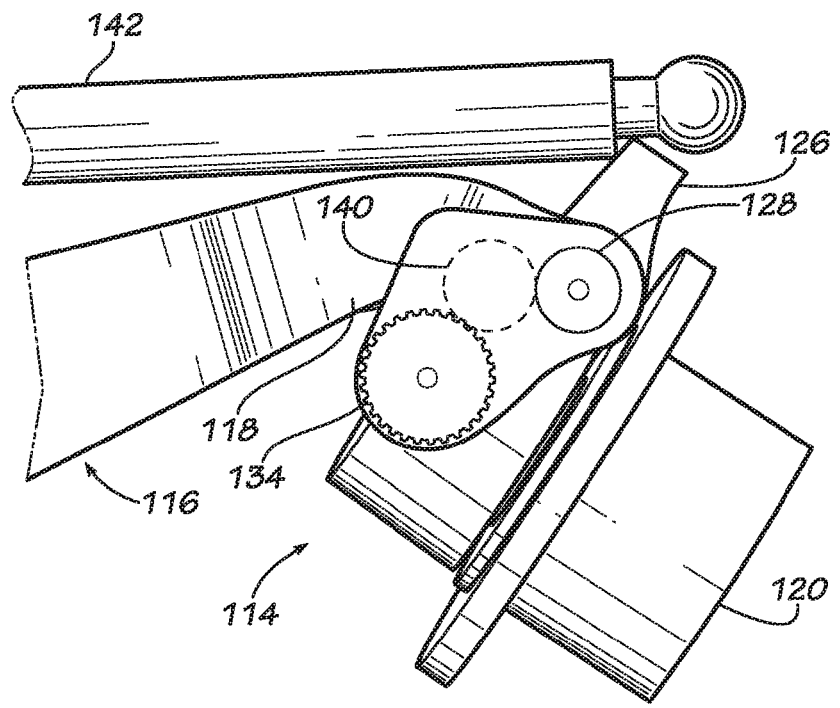
FIG. 19 is a top view of the right end of the axle assembly shown in FIGS. 16 and 17, showing the double kingpin hinge arrangement in more detail.
Figure 20:
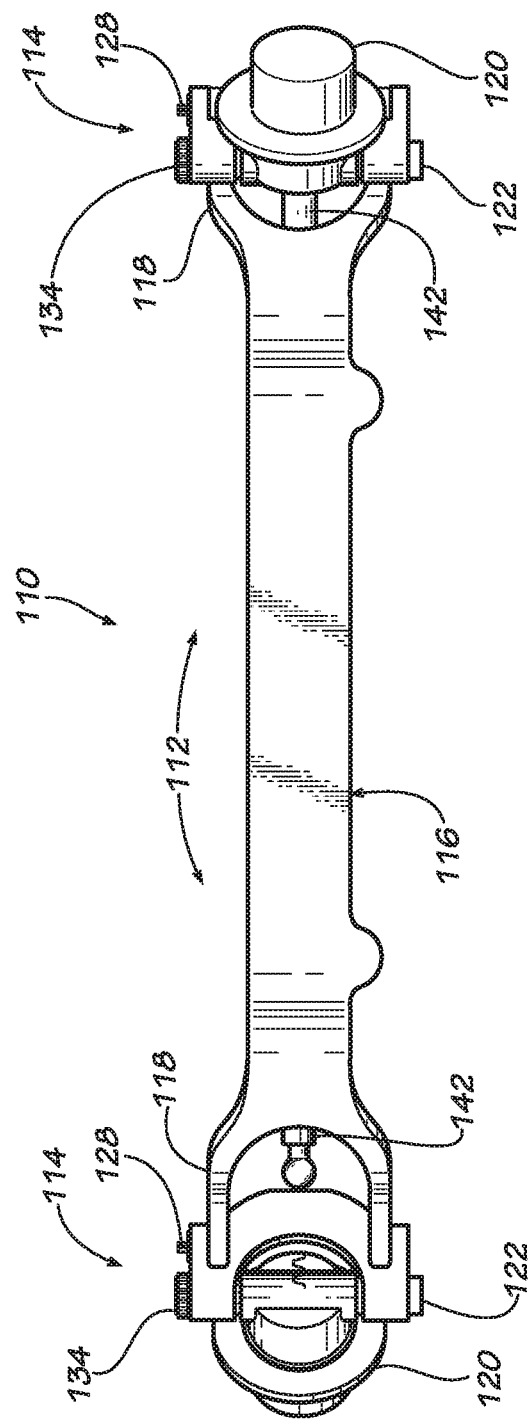
FIG. 20 is a rear view of the axle assembly shown in FIGS. 16 and 17.
Figure 21:
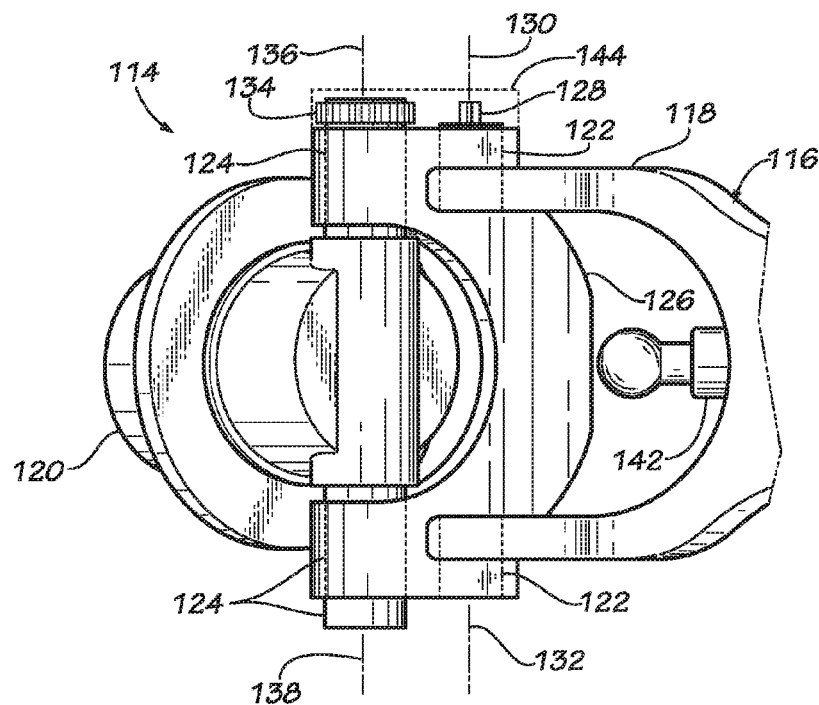
FIG. 21 is a rear view of the left end of the axle assembly shown in FIG. 20, showing the double kingpin hinge arrangement in more detail.

FIGS. 16-21 illustrate an axle assembly 110 including an embodiment of a steering arrangement 112 of the present invention with a pair of double kingpin hinge arrangements 114. The axle assembly 110 includes an axle 116 with opposite axle ends 118, a pair of axle hubs 120, and a pair of double kingpin hinge arrangements 114, with each double kingpin hinge arrangement 114 interconnecting between an axle hub 120 and a respective axle end 118. Each axle end 118, pair of axle hubs 120 and pair of double kingpin hinge arrangements 114 are assumed to be configured substantially identical, and therefore the detailed description which follows hereinafter is understood to apply to both the left and the right ends of axle assembly 14. FIG. 16 shows the left and right wheels at a zero degree (0°) steering angle, FIGS. 17 and 20 show the left and right wheels turned to the right, FIGS. 18 and 21 show the left wheel pivoted to the front, and FIG. 19 shows the right wheel pivoted to the rear.

The double kingpin hinge arrangement 114 includes a first pivot pin 122, a second pivot pin 124 and a knuckle 126 which interconnects between the first pivot pin 122 and second pivot pin 124. The first pivot pin 122 interconnects one end of the knuckle 126 with the axle end 118, and the second pivot pin 124 is positioned rearward of the first pivot pin 122 and interconnects an opposite end of the knuckle 126 with the axle hub 120. First pivot pin 122 and second pivot pin 124 each have a generally vertical orientation, and may be configured with any desired King Pin Inclination (KPI) and caster angle.

The double kingpin hinge arrangement 114 further includes a first circular member 128 coupled with and having a first axis 130 generally coincident with a first pivot axis 132 of the first pivot pin 122, and a second circular member 134 having a second axis 136 generally coincident with a second pivot axis 138 of the second pivot pin 124. The first circular member 128 is non-rotatable about the first axis 130 (and first pivot axis 132), and the second circular member 134 is rotatable about the second axis 136 (and second pivot axis 138). The second circular member 134 is rotationally coupled with and driven by the first circular member 128. More particularly, in the embodiment illustrated in FIGS. 16-21, the first circular member 128 and second circular member 134 are each configured as gears, and the first gear 128 indirectly drives the second gear 134 through an intervening third gear 140 (the third gear 140 is only shown in phantom lines in FIGS. 18 and 19 for ease of illustration and simplicity sake). The third gear 140 reverses the direction of rotation of the second gear 134 so that the second gear 134 rotates in the correct direction during operation. The first gear 128 is shown with a diameter which is much smaller than the diameter of the second gear 134; however, the first gear 128 and the second gear 134 can be configured with any desired gear ratio therebetween, depending on the application. Further, the third gear 140 is shown slightly offset to the side of the first gear 128 and the second gear 134, but again the size and placement of the third gear 140 can vary, depending on the application. For some applications, it may also be possible to directly drive the second gear 134 using an enmeshing first gear 128, without the use on an intervening third gear 140.

The first gear 128 could potentially be driven by an actuator (e.g., an electric or hydraulic motor (not shown)) which would rotate the first gear 128 in a selected direction, and thereby rotate the second and third gears 134 and 140 to extend or retract the double kingpin hinge arrangement 114. However, in the illustrated embodiment, an actuator does not engage the first gear 128 to extend or retract the double kingpin hinge arrangement 114. Rather, the axle assembly 110 can include any type of steering cylinder configuration to extend or retract the double kingpin hinge arrangement 114 axially inward or outward, such as the rear steering cylinder(s) 102 and/or front steering cylinder(s) 104 shown in FIGS. 9-15. The steering cylinder configuration can extend between the axle 116 and knuckle 126 and/or axle hub 120 to extend or retract the double kingpin hinge arrangement 114. Such a steering cylinder configuration can include a tie rod (such as the tie rod 142 shown at the front of the axle 116), or can use the steering cylinders without a tie rod, such as shown in FIGS. 13-15.

The first gear 128, second gear 134 and third gear 140 are shown exposed to the ambient environment for simplicity sake, and for some applications the exposed gears may be acceptable. For other applications, it may be desirable or necessary to enclose the gears 128, 134 and 140 in a housing 144 (shown in dashed lines in FIG. 21) at the top of the knuckle 126.

Further, it may be desirable to place the first gear 128, second gear 134, third gear 140 and housing 144 beneath the knuckle 126, rather than above the knuckle 126.

During operation, as the steering cylinders expand or retract the double kingpin hinge arrangement 114, the first gear 128 remains stationary, while the intervening third gear 140 and second gear 134 rotate. The third gear 140 reverses the direction of rotation of the second gear 134, so that it rotates in the same direction as the first gear 128. Comparing FIGS. 18 and 19, the left hand double kingpin hinge arrangement 114 (FIG. 18) is shown in an extended position, while the right hand double kingpin hinge arrangement 114 (FIG. 19) is shown in a retracted position. It can easily be seen that the knuckle 126 is further from the axle hub 120 in FIG. 18, and almost immediately adjacent to the axle hub in FIG. 19. The extended clearance distance shown in FIG. 18 allows the wheel (not shown) to have a greater steering angle while still not impacting with the chassis or other structure of the vehicle.

Figure 22:
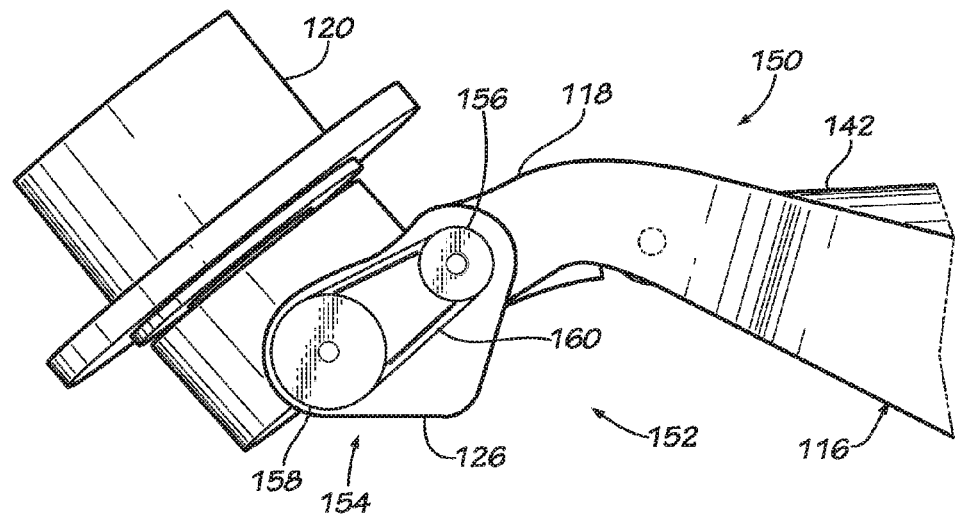
FIG. 22 is a top view of the left end of an axle assembly with yet another embodiment of a steering arrangement of the present invention including a double kingpin hinge arrangement.

FIG. 22 illustrates an axle assembly 150 including another embodiment of a steering arrangement 152 of the present invention with a pair of double kingpin hinge arrangements 154 located at opposite ends of an axle 116. Axle assembly 150 is similar to the axle assembly 110 shown and described above with reference to FIGS. 16-21, in that the double kingpin hinge arrangement include first and second circular members. Axle assembly 150 primarily differs from axle assembly 110 in that it includes a first circular member 156 in the form of a first pulley, and a second circular member 158 in the form of a second pulley. The first pulley 156 drives the second pully 158 using a belt 160. Using pulleys rather than gears, the pulleys rotate in the same direction and therefore no intervening circular member (i.e., pulley) is necessary (such as the intervening third gear 140 used with the axle assembly 110). Other than replacing the gears with pulleys, the axle assembly 150 is similar to the axle assembly 110 which is shown and described in detail above, and thus no further explanation of the axle assembly 150 is provided herein.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An axle assembly for a vehicle, comprising:
   an axle having opposite axle ends; and
   a pair of axle hubs;
   a pair of double kingpin hinge arrangements, each said double kingpin hinge arrangement including a first pivot pin connected with a respective one of said axle ends, a second pivot pin operatively associated with a respective said axle hub, and a knuckle interconnecting said first pivot pin and said second pivot pin; and
   at least one steering cylinder associated with each said double kingpin hinge arrangement, each said steering cylinder being interconnected between said axle and said knuckle or said axle hub.

2. The axle assembly of claim 1, wherein each said knuckle is an inboard knuckle, and each said double kingpin hinge arrangement further includes an outboard knuckle, each said first pivot pin interconnecting one end of said inboard knuckle with said one axle end, each said second pivot pin interconnecting an opposite end of said inboard knuckle with said outboard knuckle, each said outboard knuckle being connected with a respective said axle hub.

3. The axle assembly of claim 2, wherein each said double kingpin hinge arrangement further includes a mechanical stop which limits a rotation of said inboard knuckle about said first pivot pin in a direction toward said one axle end, whereby said outboard knuckle can rotate about said second pivot pin when said inboard knuckle engages said mechanical stop.

4. The axle assembly of claim 3, wherein each said mechanical stop comprises one of:
   a stop surface associated with a respective axle end; and
   a fluid cylinder interconnected between said axle and said inboard knuckle (28).

5. The axle assembly of claim 3, wherein said first pivot pin defines a first pivot axis and said second pivot pin defines a second pivot axis, and wherein said mechanical stop is located relative to a stop angle between a transverse axis which is perpendicular to a longitudinal axis of said axle, and a line extending between said first pivot axis and said second pivot axis, said stop angle being between approximately 0° to 20°.

6. The axle assembly of claim 2, wherein each said double kingpin hinge further includes at least one lock, each said lock configured for locking said inboard knuckle relative to said axle or said outboard knuckle, each said lock comprising:
   a cam and pin lock arrangement which locks said inboard knuckle and said outboard knuckle relative to each other;
   a pin lock arrangement which locks said inboard knuckle and a respective said axle end relative to each other; or
   a fluid cylinder lock arrangement which locks said inboard knuckle relative to said axle or said outboard knuckle.

7. The axle assembly of claim 2, wherein said at least one steering cylinder includes at least one of:
   a pair of rear steering cylinders interconnected between said axle and a respective said inboard knuckle;
   a front steering cylinder associated with said tie rod; and
   a pair of front steering cylinders interconnected between said inboard knuckle and a respective said outboard knuckle.

8. The axle assembly of claim 7, further including a tie rod extending between said outboard knuckles.

9. The axle assembly of claim 2, wherein said at least one steering cylinder is configured for selectively at least one of:
   steering the axle hubs at a narrow wheel stance;
   extending the axle hubs to an extended wheel stance;
   steering the axle hubs at the extended wheel stance;
   retracting the axle hubs from the extended wheel stance to the narrow wheel stance.

10. The axle assembly of claim 1, wherein each said second pivot pin is connected to a respective said axle hub, and each said double kingpin hinge arrangement further includes a first circular member coupled with and having a first axis generally coincident with a first pivot axis of said first pivot pin, and a second circular member having a second axis generally coincident with a second pivot axis of said second pivot pin, said second circular member being rotationally coupled with said first circular member.

11. The axle assembly of claim 10, wherein first circular member is non-rotatable about said first pivot axis, and said second circular member is rotatable about said second pivot axis.

12. The axle assembly of claim 11, wherein said first circular member comprises a first gear, and said second circular member comprise a second gear which is driven by said first gear.

13. The axle assembly of claim 12, wherein said second gear is driven by said first gear by an intervening gear or is directly enmeshed with said first gear.

14. The axle assembly of claim 11, wherein said first circular member comprises a first pulley, and said second circular member comprise a second pulley which is driven by said first pulley.

15. The axle assembly of claim 11, wherein said first circular member and said second circular member each have a selected diameter providing a selected drive ratio therebetween.

16. An agricultural work vehicle, comprising:
a body; and
an axle assembly carried by said body, said axle assembly including:
an axle having opposite axial ends;
a pair of axle hubs; and
a pair of double kingpin hinge arrangements, each said double kingpin hinge arrangement including a first pivot pin connected with a respective one of said axle ends, a second pivot pin operatively associated with a respective said axle hub, and a knuckle interconnecting said first pivot pin and said second pivot pin; and
at least one steering cylinder associated with each said double kingpin hinge arrangement, each said steering cylinder being interconnected between said axle and said knuckle or said axle hub.

17. The axle assembly of claim 16, wherein each said knuckle is an inboard knuckle, and each said double kingpin hinge arrangement further includes an outboard knuckle, each said first pivot pin interconnecting one end of said inboard knuckle with said one axle end, each said second pivot pin interconnecting an opposite end of said inboard knuckle with said outboard knuckle, each said outboard knuckle being connected with a respective said axle hub.

18. The axle assembly of claim 16, wherein each said second pivot pin is connected to a respective said axle hub, and each said double kingpin hinge arrangement further includes a first circular member coupled with and having a first axis generally coincident with a first pivot axis of said first pivot pin, and a second circular member having a second axis generally coincident with a second pivot axis of said second pivot pin, said second circular member being rotationally coupled with said first circular member.

19. The axle assembly of claim 18, wherein said first circular member is non-rotatable about said first pivot axis, and said second circular member is rotatable about said second pivot axis.

20. The axle assembly of claim 19, wherein said first circular member comprises a first gear or a first pulley, and said second circular member comprises a mating second gear or a second pulley.

* * * * *